United States Patent
Baracaldo Angel et al.

(10) Patent No.: US 11,240,243 B2
(45) Date of Patent: Feb. 1, 2022

(54) PREVENTING STATISTICAL INFERENCE ATTACKS ON DATA THAT IS SHARED AMONG MULTIPLE STAKEHOLDERS WITH DISJOINT ACCESS PRIVILEGES

(71) Applicant: INTERNATIONAL BUSINESS MACHINES CORPORATION, Armonk, NY (US)

(72) Inventors: Nathalie Baracaldo Angel, San Jose, CA (US); Robert Engel, San Francisco, CA (US); Heiko H. Ludwig, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 15/703,331

(22) Filed: Sep. 13, 2017

(65) Prior Publication Data
US 2019/0081950 A1 Mar. 14, 2019

(51) Int. Cl.
*H04L 29/06* (2006.01)
*G06F 21/62* (2013.01)
*H04L 9/32* (2006.01)
*G06F 21/64* (2013.01)
*H04L 9/08* (2006.01)

(52) U.S. Cl.
CPC .......... *H04L 63/10* (2013.01); *G06F 21/6245* (2013.01); *G06F 21/64* (2013.01); *H04L 9/088* (2013.01); *H04L 9/0894* (2013.01); *H04L 9/3226* (2013.01); *H04L 9/3239* (2013.01); *H04L 9/3247* (2013.01); *H04L 9/3297* (2013.01); *H04L 63/0407* (2013.01); *H04L 63/123* (2013.01); *H04L 63/0428* (2013.01); *H04L 2209/20* (2013.01); *H04L 2209/38* (2013.01); *H04L 2209/42* (2013.01); *H04L 2209/88* (2013.01)

(58) Field of Classification Search
CPC ....... H04L 63/10; H04L 9/3226; G06F 21/64; G06F 21/6245
USPC .......................................................... 726/22
See application file for complete search history.

(56) References Cited

U.S. PATENT DOCUMENTS

| | | | | |
|---|---|---|---|---|
| 2007/0150965 A1* | 6/2007 | Redlich | ............... | H04L 63/0428 726/27 |
| 2008/0222734 A1* | 9/2008 | Redlich | ............... | G06F 21/577 726/26 |
| 2016/0358165 A1 | 12/2016 | Maxwell | | |
| 2017/0041302 A1* | 2/2017 | Oxford | ............... | H04L 63/061 |
| 2020/0143367 A1* | 5/2020 | LeBeau | ............... | H04L 9/3297 |

OTHER PUBLICATIONS

Mell et al., "The NIST Definition of Cloud Computing," U.S. Department of Commerce, National Institute of Standards and Technology, Sep. 2011, p. 1-7, Special Publication 800-145.
Azaria et al., "MedRec: Using Blockchain for Medical Data Access and Permission Management", 2016 2nd International Conference on Open and Big Data, Aug. 22-24, 2016, Vienna, Austria, pp. 25-30.
Dwork, "Differential Privacy: A Survey of Results" TAMC 2008 Proceedings of the 5th International Conference on Theory and Applications of Models of Computation, vol. 4978, Xi'an, China, Apr. 25-29, 2008, pp. 1-19.
Github, "Quorum Whitepaper", https://github.com/jpmorganchase/quorum-docs/blob/master/Quorum%20Whitepaper%20v0.1.pdf, Accessed on Sep. 7, 2017, pp. 1-8.
Rodriguez-Cano et al., "Event Invitations in Privacy-Preservmg DOSNs: Formalization and Protocol Design", Privacy and Identity Management for the Future Internet in the Age of Globalisation: 9th IFIP WG 9.2, 9.5, 9.6/11.7, 11.4, 11.6/SIG 9.2.2 International Summer School, Patras, Greece, Sep. 7-12, 2014, Revised Selected Papers (pp. 185-200), Springer International Publishing, IFIP Advances in Information and Communication Technology.
Zyskind et al., "Decentralizing Privacy: Using Blockchain to Protect Personal Data", 2015 IEEE CS Security and Prvacy Workshops, May 21-22, 2015, Sane Jose, CA, USA, pp. 180-184.

* cited by examiner

*Primary Examiner* — Jeffrey C Pwu
*Assistant Examiner* — Nega Woldemariam
(74) *Attorney, Agent, or Firm* — Anthony Curro

(57) ABSTRACT

According to one embodiment, a method, computer system, and computer program product for preventing statistical inference attacks is provided. The present invention may include splitting records into items, and classifying these items into shared items and private items; grouping the private items according to privacy and confidentiality requirements; restricting access of the private items to stakeholders based on the confidentiality requirements using cryptographic keys; generating and encrypting one or more placeholders for both existent and non-existent stakeholders; storing private items in private storage as indicated by links; creating shared records comprising links, placeholders, and shared items; adding integrity signatures to the shared records; and publishing the shared records to a shared medium.

20 Claims, 9 Drawing Sheets

PREVENTING STATISTICAL INFERENCE ATTACKS ON DATA THAT IS SHARED AMONG MULTIPLE STAKEHOLDERS WITH DISJOINT ACCESS PRIVILEGES

BACKGROUND

The present invention relates, generally, to the field of computing, and more particularly to information privacy.

In this modern age of computing, the ubiquity and global scale of computer networks has resulted in data collection and transmission on an unprecedented scale. A large portion of this information includes medical records, financial transactions, educational transcripts, geographical data, voting records, legal documents, and other such data of great importance to the individuals to which they pertain. As a result, the risks of sensitive information falling into the hands of those for which it was not intended have likewise increased in scale; the field of information privacy is concerned with ensuring that such sensitive data may only be accessed by authorized individuals through a variety of means, including data masking, data and network traffic encryption, digital risk management, and other forms of access control.

SUMMARY

According to one embodiment, a method, computer system, and computer program product for preventing statistical inference attacks is provided. The present invention may include splitting records into items, and classifying these items into shared items and private items; grouping the private items according to privacy and confidentiality requirements; restricting access of the private items to stakeholders based on the confidentiality requirements using cryptographic keys; generating and encrypting one or more placeholders for both existent and non-existent stakeholders; storing private items in private storage as indicated by links; creating shared records comprising links, placeholders, and shared items; adding integrity signatures to the shared records; and publishing the shared records to a shared medium.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
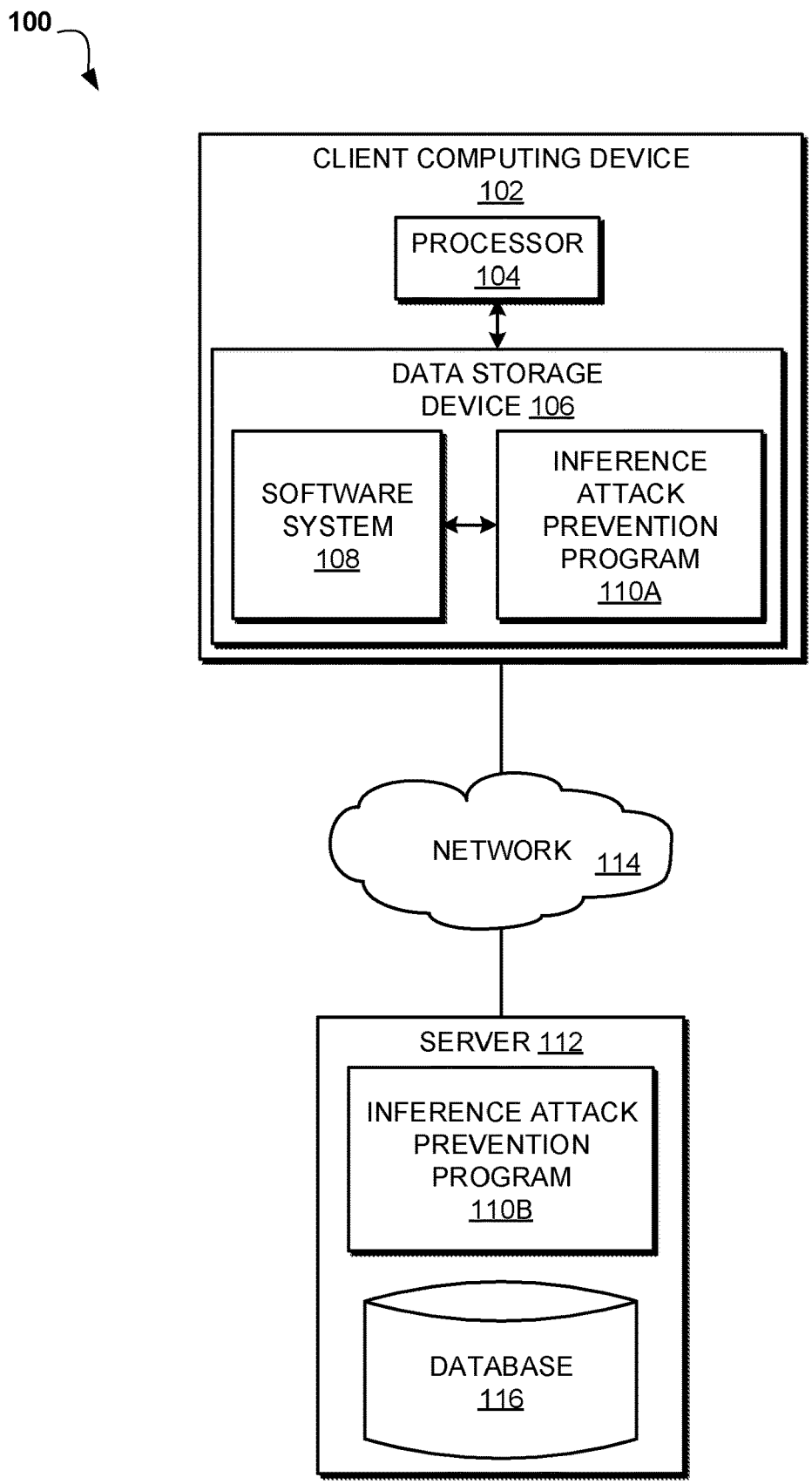
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to information privacy. The following described exemplary embodiments provide a system, method, and program product to, among other things, prevent statistical inference attacks on data that is shared among multiple stakeholders with disjoint access privileges. Therefore, the present embodiment has the capacity to improve the technical field of information privacy by providing a method that allows for the sharing of records using shared media (e.g. the public ledger of a blockchain) while preserving full privacy and fine-grained access controls for particular fields of these records, including protection against statistical inference.

As previously described, in this modern age of computing the ubiquity and global scale of computer networks has resulted in data collection and transmission on an unprecedented scale. As a result, the risks of sensitive data falling into the hands of those for which it was not intended has likewise increased in scale; the field of information privacy is concerned with ensuring that such sensitive data may only be accessed by authorized individuals. A significant threat that the field of information privacy seeks to combat is a data mining technique known as an inference attack; in an inference attack, an adversary analyzes trivial information to infer more robust information about a database without directly accessing it. As an example, an adversary may have access to the public ledger of a blockchain containing private stored medical records. This shared record may contain encrypted medical information that is inaccessible, but leave available which type of specialist can access the encrypted information; from the number of specialists able to access encrypted information of a patient, an adversary may be able to infer that a person has a serious condition that requires the attention of multiple specialists. Additionally, the size of the file containing the encrypted data could allow an adversary to infer that more data is being gathered on a patient, and therefore more monitoring is being conducted than usual, which may indicate a serious condition. As more and more records are digitized, inference attacks present an increasing threat.

Typically, the issues of privacy and fine-grained access control have been handled on a per-record level. However, preventing statistical inference on attributes of multiple (encrypted) records, for example based on the size of the ciphertext, has remained an issue. While differential privacy approaches allow for the prevention of statistical inference over multiple records, this method is not ideal because it may require adding negative data noise (i.e. removing data from the records); this might not always be an option, such as when healthcare records are stored on a blockchain in order to ensure non-repudiability. As a result, file systems containing multiple encrypted records are vulnerable to statistical inference attack; as an example, in the context of a healthcare application, patient health records of a large number of patients are collected and stored in an encrypted fashion on a blockchain. This is done in order to ensure non-repudiability, and to preserve per-record privacy. However, under the assumption that larger health records imply 'sicker' patients, an attacker who has access to the public ledger of the blockchain is still able to distinguish between 'more sick' and 'less sick' patients by looking at the size of the encrypted records, despite the records being encrypted. As such, it may be advantageous to, among other things, implement a system where the shared record contains encrypted links to the private records such that the shared record does not vary in size, and the private records and shared records can only link to the corresponding shared record by stakeholders who are in the possession of the corresponding decryption key. Because the shared records are partly encrypted and do not vary in size, they do not reveal any sensitive information about the record, even when statistical methods are applied over sets of such records in an attempt to correlate their size with their contents.

According to one embodiment, the invention is relevant to systems requiring fine-grained access control for sensitive data in combination with shared-access media for storage and data access; the invention involves a method to transform records containing an arbitrary number of shared data items and private data items into one shared record and multiple encrypted private records, where the shared record contains encrypted links to the private records such that the shared record does not vary in size, and the private records and shared records can only link to the corresponding shared record by stakeholders who are in the possession of the corresponding decryption key.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to prevent statistical inference attacks on data that is shared among multiple stakeholders with disjoint access privileges.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to store a public ledger, shared records, and/or private records, and is further enabled to host and run a software system 108 and an inference attack prevention program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running an inference attack prevention program 110B and a database 116 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

In accordance with embodiments of the invention, software system 108 may be any system requiring fine-grained access control for sensitive data in combination with shared-access media for storage and data access. An example of software system 108 may include a healthcare application that stores patient health records in a blockchain. Software system 108 may be entirely located on client computing device 102, may be entirely located on any other computing and/or storage device in communication with inference attack prevention program 110A, 110B, or may be distributed in its operation and/or data storage over any number of computing devices in communication with inference attack prevention program 110A, 110B.

Database 116 may be any digital data repository capable of storing sensitive data, in encrypted or unencrypted format. Database 116 may be capable of storing binary large object (BLOB) files, and may be integrated with any database management system.

According to the present embodiment, the inference attack prevention program 110A, 110B may be a program able to prevent statistical inference attacks on data that is shared among multiple stakeholders with disjoint access privileges. The statistical inference attack prevention method is explained in further detail below with respect to FIG. 2, FIG. 3, and FIGS. 4A and 4B.

Figure 2:
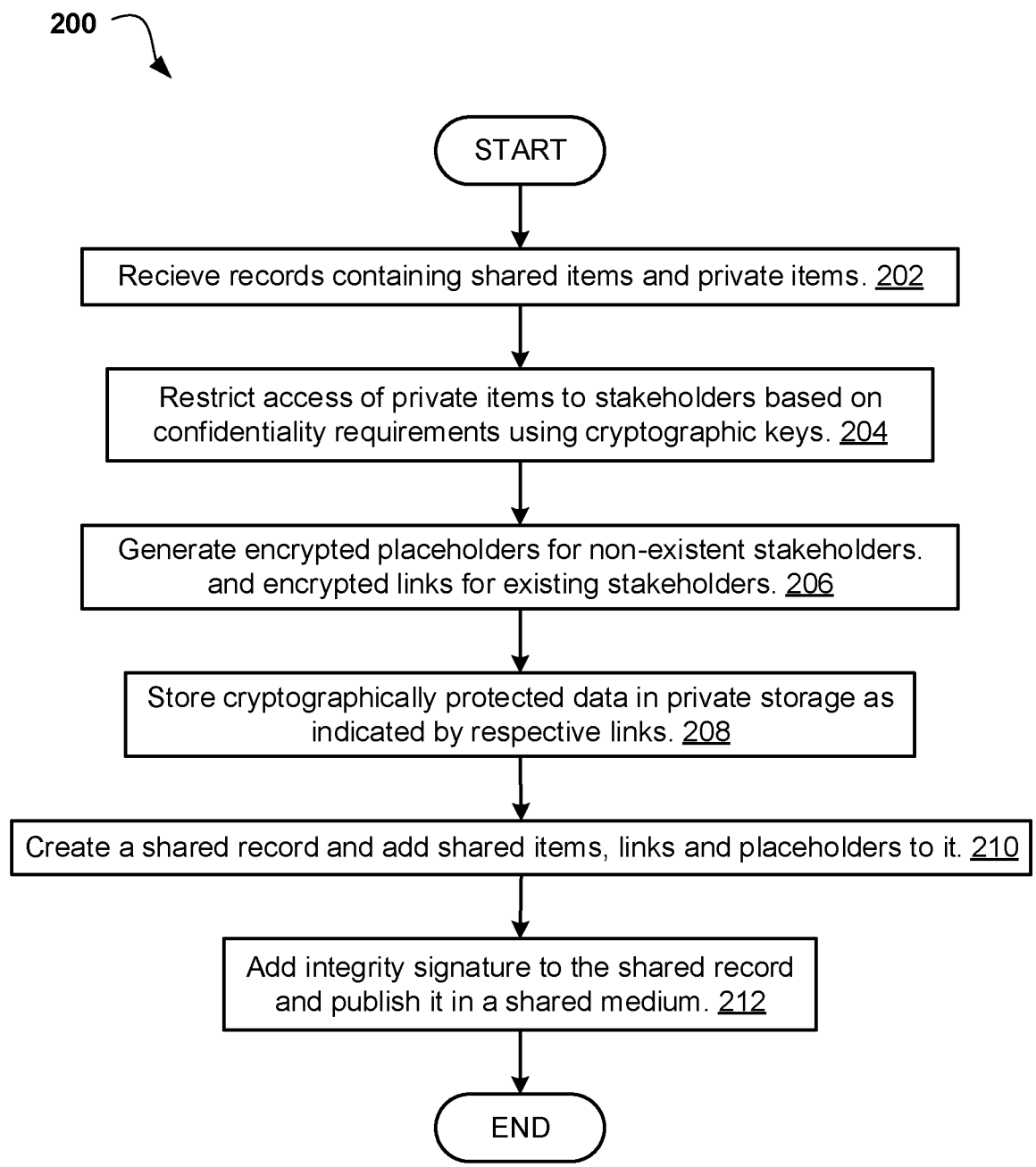
FIG. 2 is an operational flowchart illustrating an inference attack prevention process according to at least one embodiment.

Referring now to FIG. 2, an operational flowchart illustrating an inference attack prevention process 200 is depicted according to at least one embodiment. At 202, the inference attack prevention program 110A, 110B receives records containing shared items and private items. In an alternate embodiment, inference attack prevention program 110A, 110B may split a record into items, and classifies the items into shared items and private items. Private items may be any data pertaining to an individual or group of individuals that said individual or group of individuals would prefer to keep hidden from others, with the possible exception of those with a personal or professional stake in the data; the individual or individuals to whom the data pertains and those with a personal or professional stake in the data who are explicitly authorized to access the data are collectively referred to as stakeholders. The private data may be anything from medical records and financial transactions to store inventories and travel logs. Shared items may be any data which pertains to private data but may be safely accessed by entities besides stakeholders without compromising the interests or desires of the stakeholders.

Then, at 204, inference attack prevention program 110A, 110B restricts access of private items to stakeholders based on confidentiality requirements using cryptographic keys. For example, in a private record containing medical information of a patient, one segment of the data corresponding to the location of wearable measures may be made accessible to the spouse and the family, a segment corresponding to mental health may be made accessible to a psychologist, certain segments relevant to insurance purposes may be made available to the insurance company, and all information may be made accessible to the oncologist. Cryptographic enforcement of these policies may be used to ensure no confidentiality or privacy violations occur when data is shared or stored in places where curious adversaries can have access to it, for instance the blockchain.

Next, at 206, inference attack prevention program 110A, 110B generates encrypted placeholders for non-existent stakeholders, and encrypted links for existing stakeholders. Each link or placeholder may correspond to an individual stakeholder, and each encrypted link may point to the private record for that stakeholder. Placeholders may contain no links to private records; the purpose of the placeholder is to ensure that shared records are of uniform size, and no inference can be made regarding the shared records. As an example, in the context of healthcare, a sick patient's shared items may contain links corresponding to multiple stakeholders such as oncologists, surgeons, psychologists, and more, whereas a healthy patient's shared items may contain links to few or no such stakeholders. Even if an attacker does not have access to the contents of the private items, an attacker may be able to infer the health of a patient from the number of stakeholders corresponding to the patient's private record. As such, the purpose of the placeholder is to pad the shared record with false links to stakeholders, so that an attacker cannot distinguish placeholders from links, and therefore cannot make inferences from the number of apparently genuine links in a shared record. Each link or placeholder may be encrypted with the public key of a public/private key pair of the party that is granted access to the corresponding piece of private data. Furthermore, each link may correspond with a checksum (i.e. cryptographic hash value) of the private record to which it points, for example in an object storage.

Then, at 208, inference attack prevention program 110A, 110B stores cryptographically protected data in private storage as indicated by respective links. The private storage may be encrypted, and may be encrypted using the same key that is used for the encryption of the link in the shared record that points to this private record. In other embodiments, an auxiliary key is used to encrypt the private storage and then encrypted with the same key used to encrypt the link. This private storage may be any data repository, such as database 116.

Next, at 210, inference attack prevention program 110A, 110B creates a shared record and adds shared items, links and encrypted placeholders to the shared record. This shared record may be stored in any data repository or plurality of data repositories, including but not limited to data storage device 106 and database 116. In an alternate embodiment, there may be multiple shared records. The links in the shared record may point to items in the private record that correspond to the shared items.

Then, at 212, inference attack prevention program 110A, 110B adds an integrity signature to the shared record and publishes the integrity record in a shared medium, such as a blockchain ledger. The integrity signature may be any digital signature capable of verifying the authenticity of the shared record, and ensuring that if any individual attempts to modify the content of the shared record, the signature will no longer match the content of that shared record such that it can be evident that no one modified the content of the shared record. The shared medium may be any electronic medium which can be accessed by some group of entities including but not limited to stakeholders. In some embodiments, this step may be omitted.

Figure 3:
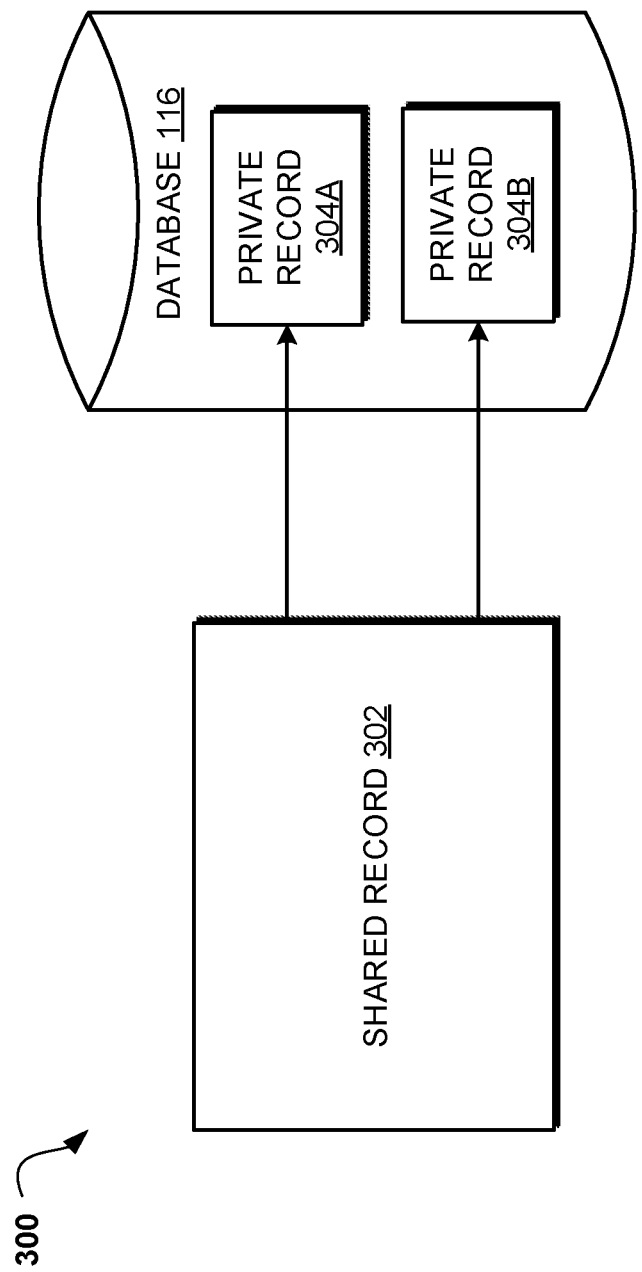
FIG. 3 illustrates an inference attack prevention process implementation according to at least one embodiment.

Referring now to FIG. 3, a statistical inference attack prevention process implementation 300 is provided according to at least one embodiment. Software system 108 may contain any number of statistical inference attack prevention process implementations 300. Statistical inference attack prevention process implementation 300 comprises a shared record 302 containing links to private records 304A, 304B which are stored in database 116. In any number of alternate embodiments, one or more shared records 302 may link to any number of private records 304A, 304B; any number of shared records may link to any number of private records.

Shared record 302 may be any record that contains shared data and a fixed-length (i.e. finite number of keys) list of encrypted links and/or encrypted placeholders. The encrypted placeholders and the encrypted links may each correspond to a specific party from the set of parties granted access to a private record 304A, 304B; the encrypted link points to the private record 304A, 304B to which the party is granted access. Each encrypted link and encrypted placeholder may be encrypted with the public key of a public/private key pair of the party that is granted access to the corresponding piece of private data in the private record 304A, 304B. Encrypted links to the private portion of the decomposed record may correspond with a checksum (i.e., cryptographic hash value) of the private record 304A, 304B that it points to. All instances of shared record 302 are the same size, in order to remove size discrepancies as a source of inference. The shared data within shared record 302 may comprise timestamp data and other such shared information, but does not include the number of access-granted stakeholders, the content of private attributes, the presence of private attributes, or even the number of private attributes of a particular record, where private attributes may be information held within a private item such as number/type of medical professionals attached to a patient, different ailments of a patient, financial transactions of an account holder, et cetera.

The private record 304A, 304B is any record that contains information which is only accessible to a limited group. This may include medical records, financial information, any information that can be used on its own or with other information to identify, contact, or locate an individual, and/or any information that an individual might want to keep private.

Figure 4A:
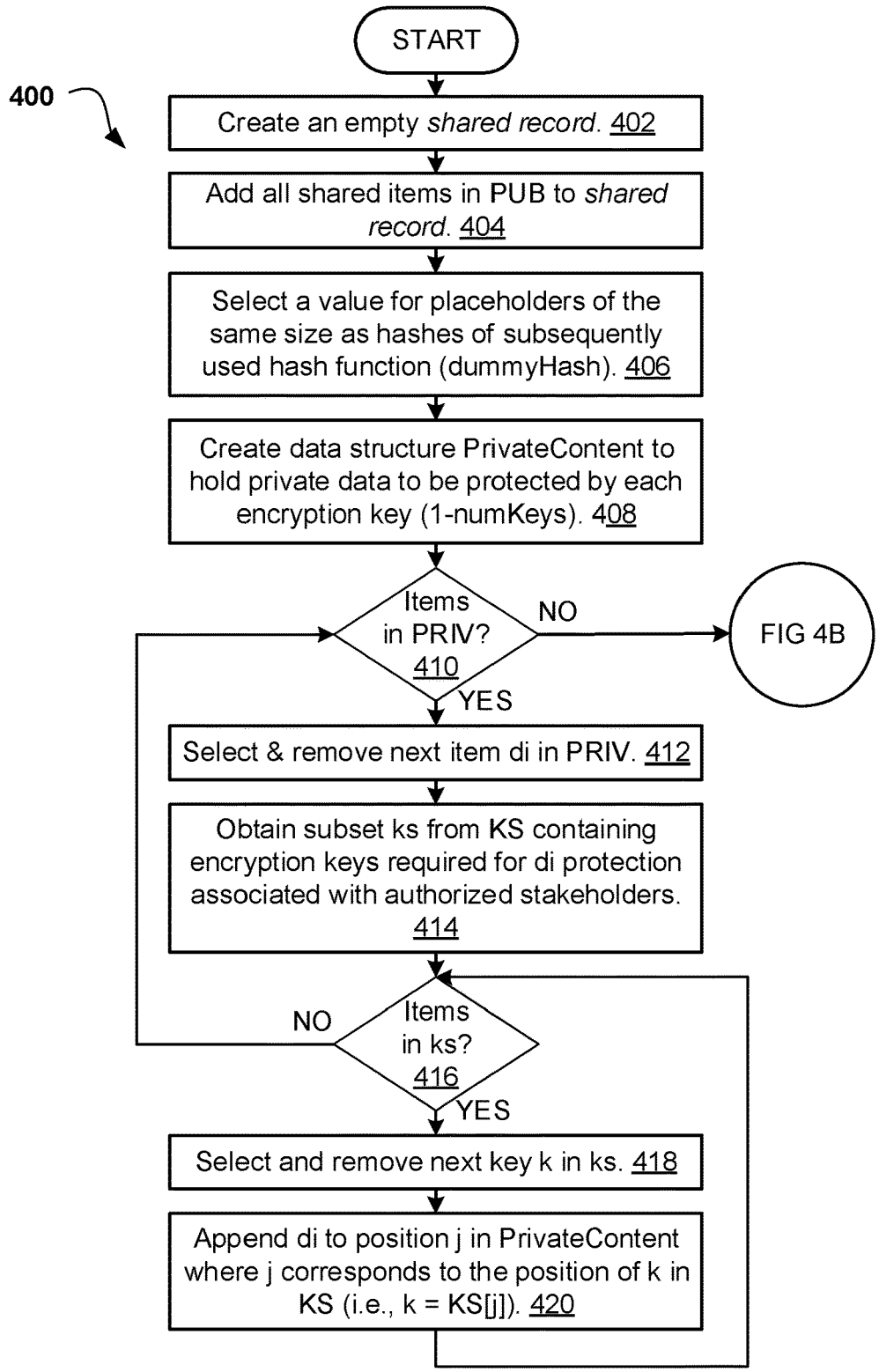
FIGS. 4A-4B are a flowchart illustrating an exemplary statistical inference attack prevention algorithm according to at least one embodiment.
Figure 4B:
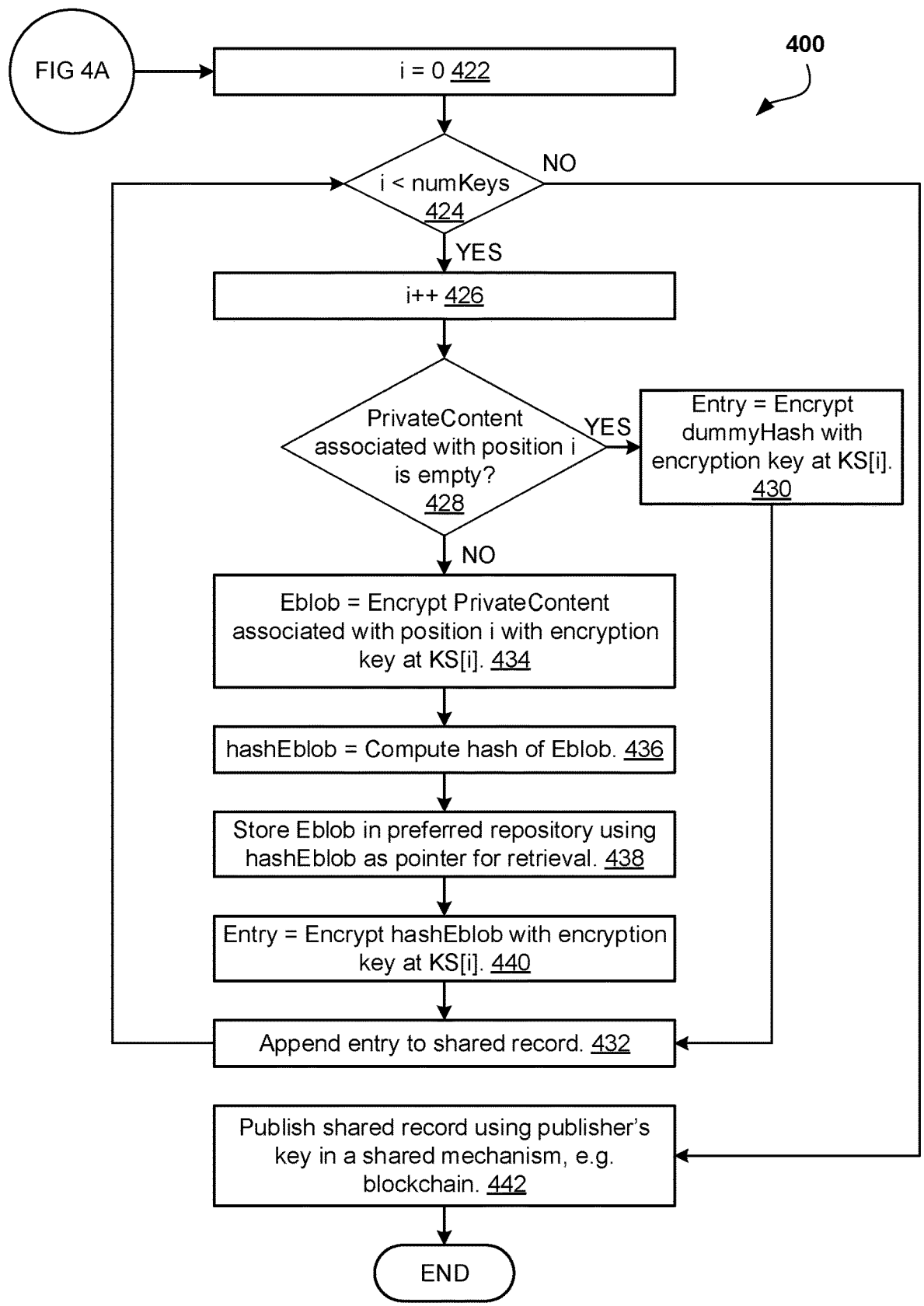

Referring now to FIGS. 4A-4B, a flowchart illustrating an exemplary statistical inference attack prevention algorithm 400 is depicted according to at least one embodiment. Statistical inference attack prevention algorithm 400 may be employed by inference attack prevention program 110A, 110B. Statistical inference attack prevention algorithm 400 may take shared and private items denoted as PUB and PRIV, respectively, as well as a list of public keys KS. These keys may correspond to stakeholders, and may be identified by their ID. Key IDs go from 1 to numKeys. In statistical inference attack prevention algorithm 400, all encryption operations may use an initialization vector to preserve confidentiality. Furthermore, embodiments using statistical inference attack prevention algorithm 400 may use object storage or some other type of storage. In FIG. 4A, at 402, inference attack prevention program 110A, 110B creates an empty shared record, and at 404 all items in PUB are added to the created shared record. Then, at 406, inference attack prevention program 110A, 110B selects a dummyHash value to be used as a placeholder. This value may have the same size as the hash values produced by the hash function used in the remainder of statistical inference attack prevention algorithm 400. After that, at 408, inference attack prevention program 110A, 110B creates a data structure PrivateContent with positions from 1 to numKeys to hold the private data that requires protection. Next, at 410, inference attack prevention program 110A, 110B checks to see if there are any private items in PRIV. As long as there are private items remaining, inference attack prevention program 110A, 110B iterates through the items di at 412, and retrieves a set of cryptographic keys ks at 414 that belong to the authorized stakeholders of di. At 416, inference attack prevention program 110A, 110B checks to see if there are items in ks, and as long as there are, inference attack prevention program 110A, 110B iterates through each key k in ks at 418, and at 420 where k has index j in KS (i.e., KS[j]=k), inference attack prevention program 110A, 110B appends di to position j of data structure PrivateContent.

Referring now to FIG. 4B, at steps 422, 424, and 426, inference attack prevention program 110A, 110B iterates through each position from 1 to numKeys in PrivateContent. At 428, inference attack prevention program 110A, 110B examines PrivateContent[i] to determine if it is empty. If PrivateContent[i] is empty, at 430 inference attack prevention program 110A, 110B encrypts dummyHash with the corresponding key, identified by sub-index i in array KS[i]. The encryption function may use an initialization vector to be secure. Then, at 432, inference attack prevention program 110A, 110B updates the shared record by appending the encrypted dummyHash. Similarly, when at 428 inference attack prevention program 110A, 110B determines that position PrivateContent[i] contains private information, such information is encrypted at 434 with key KS[i] and temporally stored in variable Eblob. At 436, the hash of Eblob, denoted by hashEblob, is then computed by inference attack prevention program 110A, 110B. Then, at 438, inference attack prevention program 110A, 110B stores Eblob in a preferred repository using hashEblob as a pointer for its retrieval. Additionally, at 440, inference attack prevention program 110A, 110B encrypts hashEblob with key KS[i]. Then, at 432, inference attack prevention program 110A, 110B updates the shared record by appending the resulting encrypted hashEblob. In this embodiment, the relative position in the shared record corresponds with the stakeholder that should receive a private item in PRIV. Lastly, at 442, and once all positions in PrivateContent have been processed, inference attack prevention program 110A, 110B shares the final shared record in the public record, and statistical inference attack prevention algorithm 400 terminates. In some embodiments, the shared record may be protected from integrity modifications by ensuring that the publisher cryptographically signs the shared record.

Figure 5:
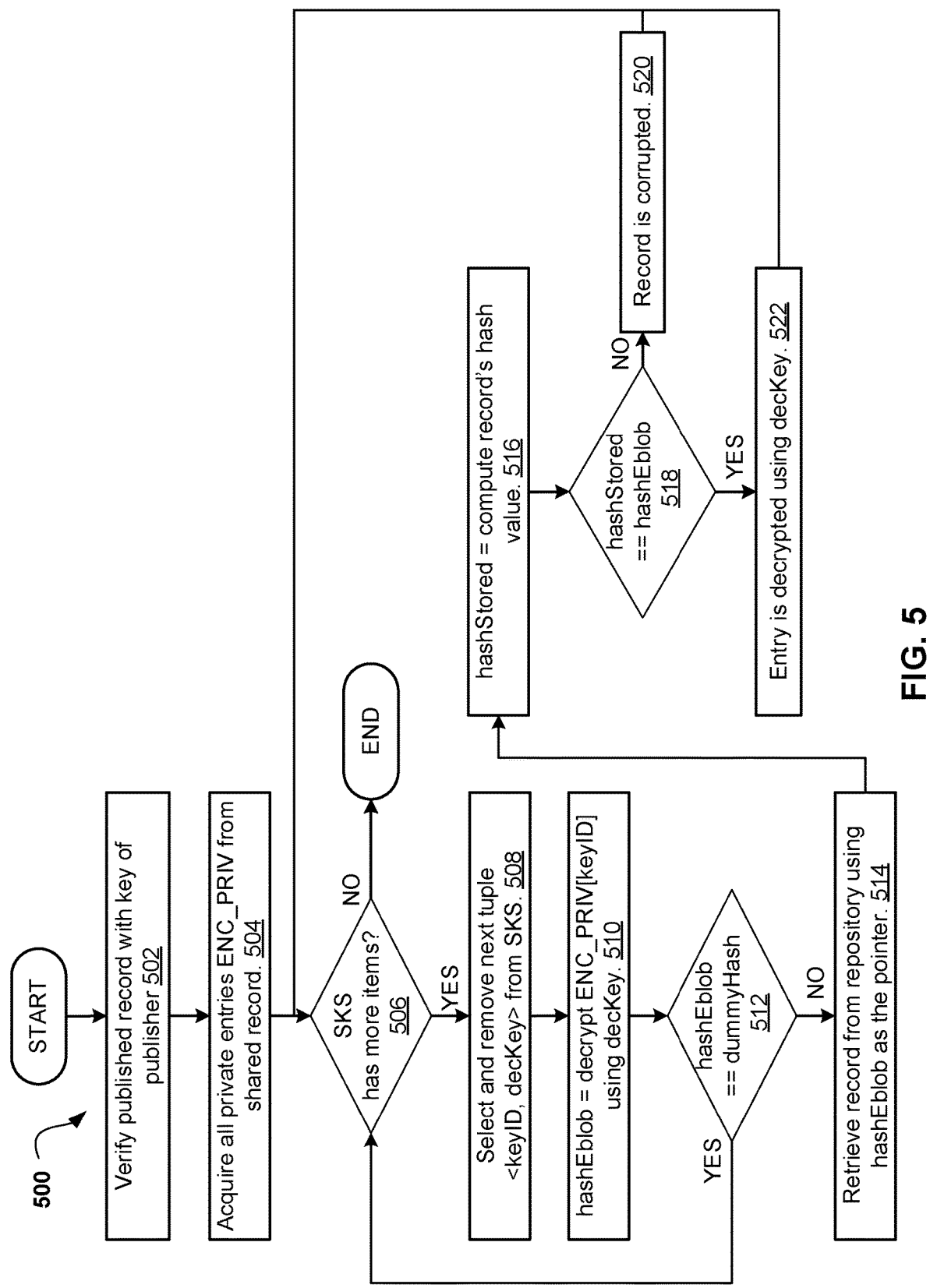
FIG. 5 is a flowchart illustrating an exemplary process for retrieving information stored according to a statistical inference attack prevention method according to at least one embodiment.

FIG. 5 is a flowchart illustrating an exemplary information retrieval process 500 for retrieving information stored according to the statistical inference attack prevention method of FIG. 2 according to at least one embodiment. Information retrieval process 500 may be executed by inference attack prevention program 110A, 110B. Information retrieval process 500 may take as inputs the shared record and a list of tuples SKS of type <keyID, decKey>, where keyID corresponds to the ID of the decryption key decKey of the stakeholder who wants to retrieve private items. In carrying out information retrieval process 500, inference attack prevention program 110A, 110B may, at 502, use the public key of the publisher to verify the integrity of a shared record given to the algorithm as an input. If the signatures don't match, inference attack prevention program 110A, 110B may issue an integrity alert. Then at 504, inference attack prevention program 110A, 110B obtains all private entries ENC_PRIV in the shared record. Each entry in ENC_PRIV contains encrypted links. As long as SKS contains items (checked for at 506), for each tuple <keyID, decKey> in SKS selected and removed by inference attack prevention program 110A, 110B at 508, at 510 inference attack prevention program 110A, 110B retrieves and decrypts that item ENC_PRIV[keyID] using decKey, and the result is stored in a variable hashEblob. If decrypted value hashEblob corresponds to dummyHash, as checked for at 512, then no information was shared with the stakeholders that have access to keyID and inference attack prevention program 110A, 110B proceeds to 506. Otherwise, at 514, hashEblob corresponds to a pointer to a data repository, and inference attack prevention program 110A, 110B proceeds to retrieve the record. Then, at 516, inference attack prevention program 110A, 110B may verify the integrity of the record by computing the hash value of the record; at 518, inference attack prevention program 110A, 110B compares the hash value of the record to hashEblob. If the hash value of the record does not match hashEblob, at 520, the entry is marked as corrupted. Otherwise, at 522, the integrity of the entry is verified and inference attack prevention program 110A, 110B decrypts the entry using decKey. In either case, inference attack prevention program 110A, 110B proceeds again to step 506, and continues executing steps of the flowchart until SKS has no more items, at which point information retrieval process 500 terminates.

It may be appreciated that FIGS. 2-5 provide only an illustration of one implementation and does not imply any limitations with regard to how different embodiments may be implemented. Many modifications to the depicted environments may be made based on design and implementation requirements.

Figure 6:
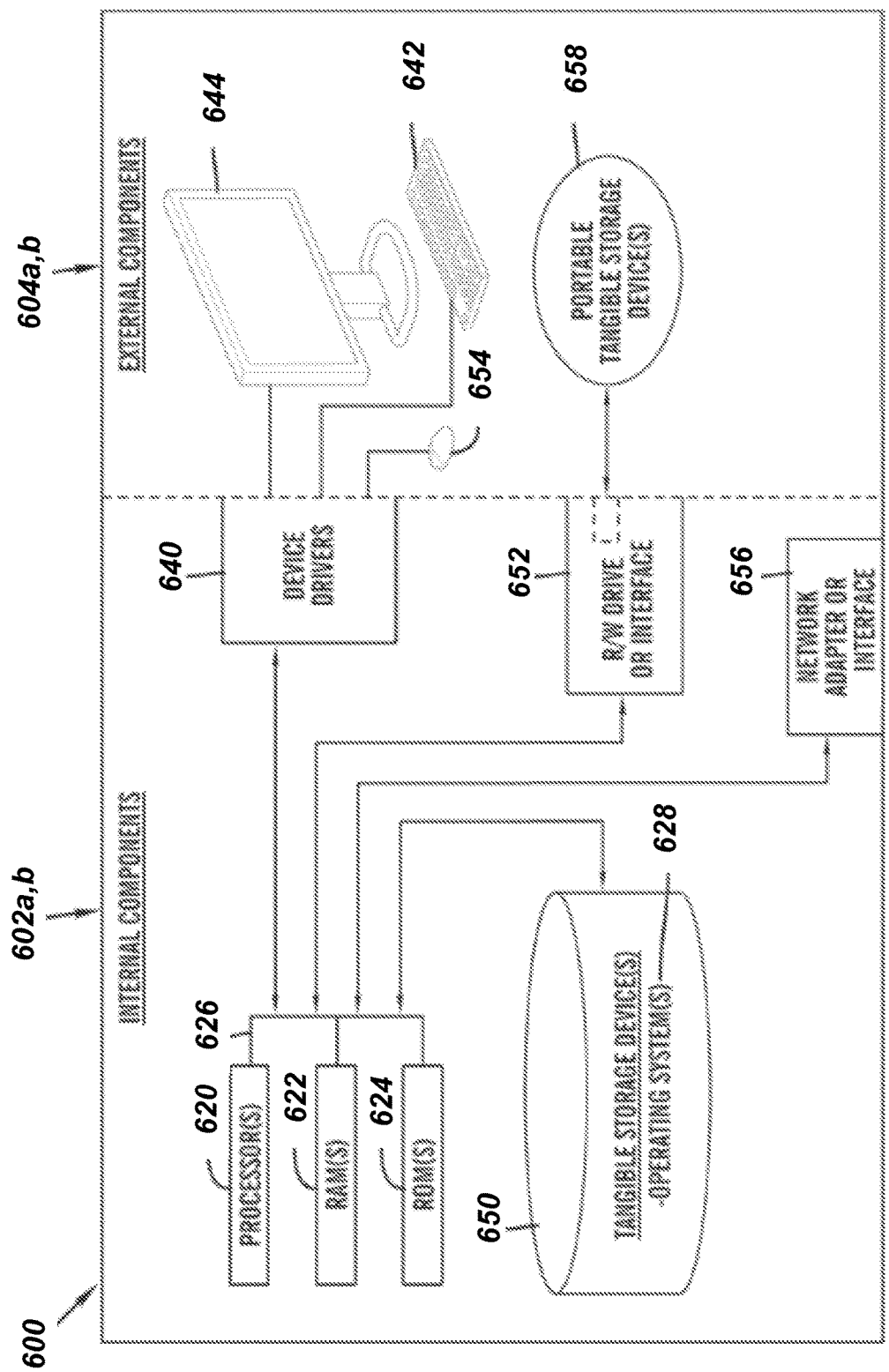
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 *a,b* and external components 604 *a,b* illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software system 108 and the inference attack prevention program 110A in the client computing device 102, and the inference attack prevention program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 *a,b* also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the inference attack prevention program 110A, 110B, can be stored on one or more of the respective portable computer-readable tangible storage devices 638, read via the respective R/W drive or interface 632, and loaded into the respective hard drive 630.

Each set of internal components 602 *a,b* also includes network adapters or interfaces 636 such as a TCP/IP adapter cards, wireless Wi-Fi interface cards, or 3G or 4G wireless interface cards or other wired or wireless communication links. The software system 108 and the inference attack prevention program 110A in the client computing device 102 and the inference attack prevention program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software system 108 and the inference attack prevention program 110A in the client computing device 102 and the inference attack prevention program 110B in the server 112 are loaded into the respective hard drive 630. The network may comprise copper wires, optical fibers, wireless transmission, routers, firewalls, switches, gateway computers and/or edge servers.

Each of the sets of external components 604 *a,b* can include a computer display monitor 644, a keyboard 642, and a computer mouse 634. External components 604 *a,b* can also include touch screens, virtual keyboards, touch pads, pointing devices, and other human interface devices. Each of the sets of internal components 602 *a,b* also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
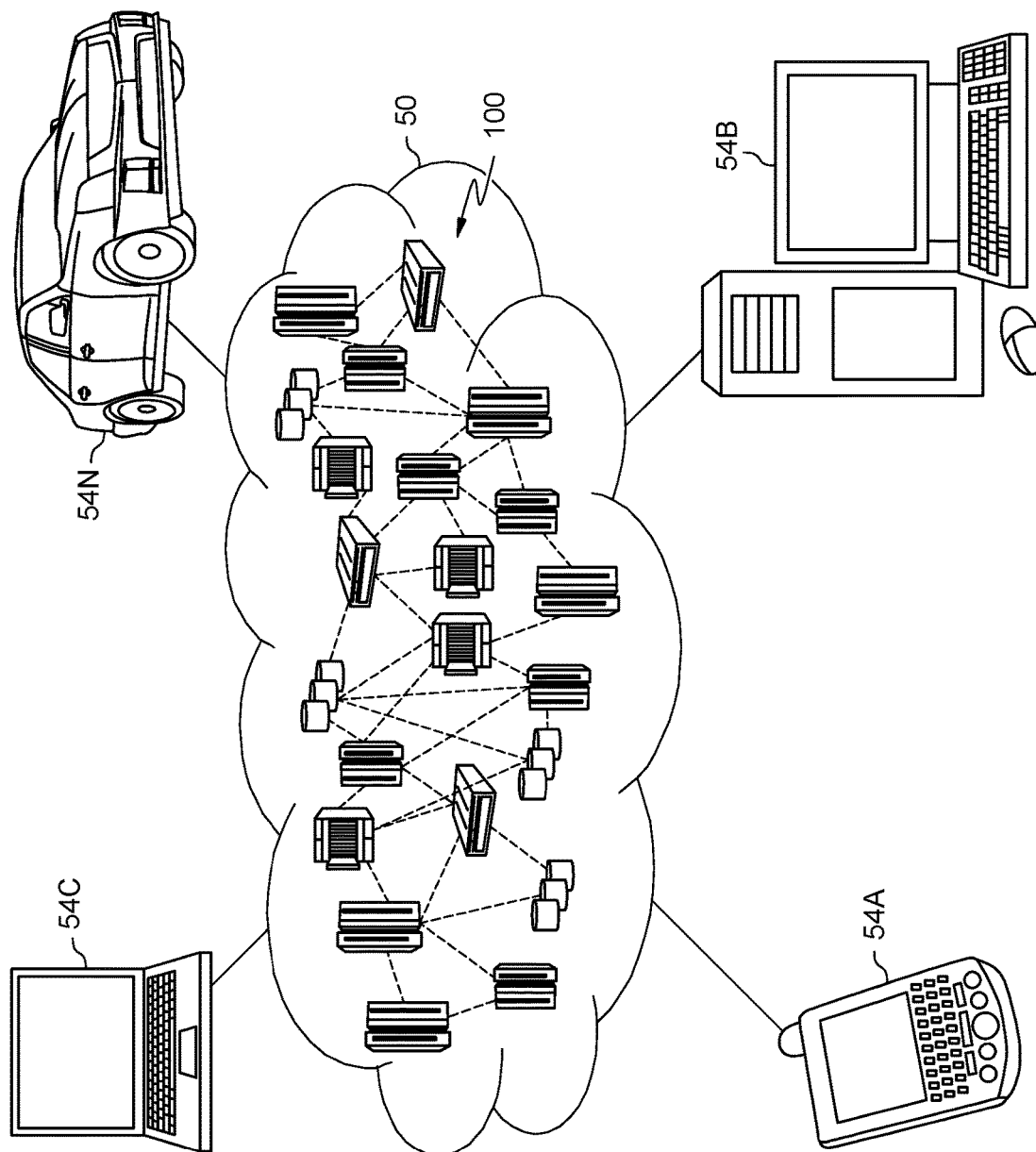
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
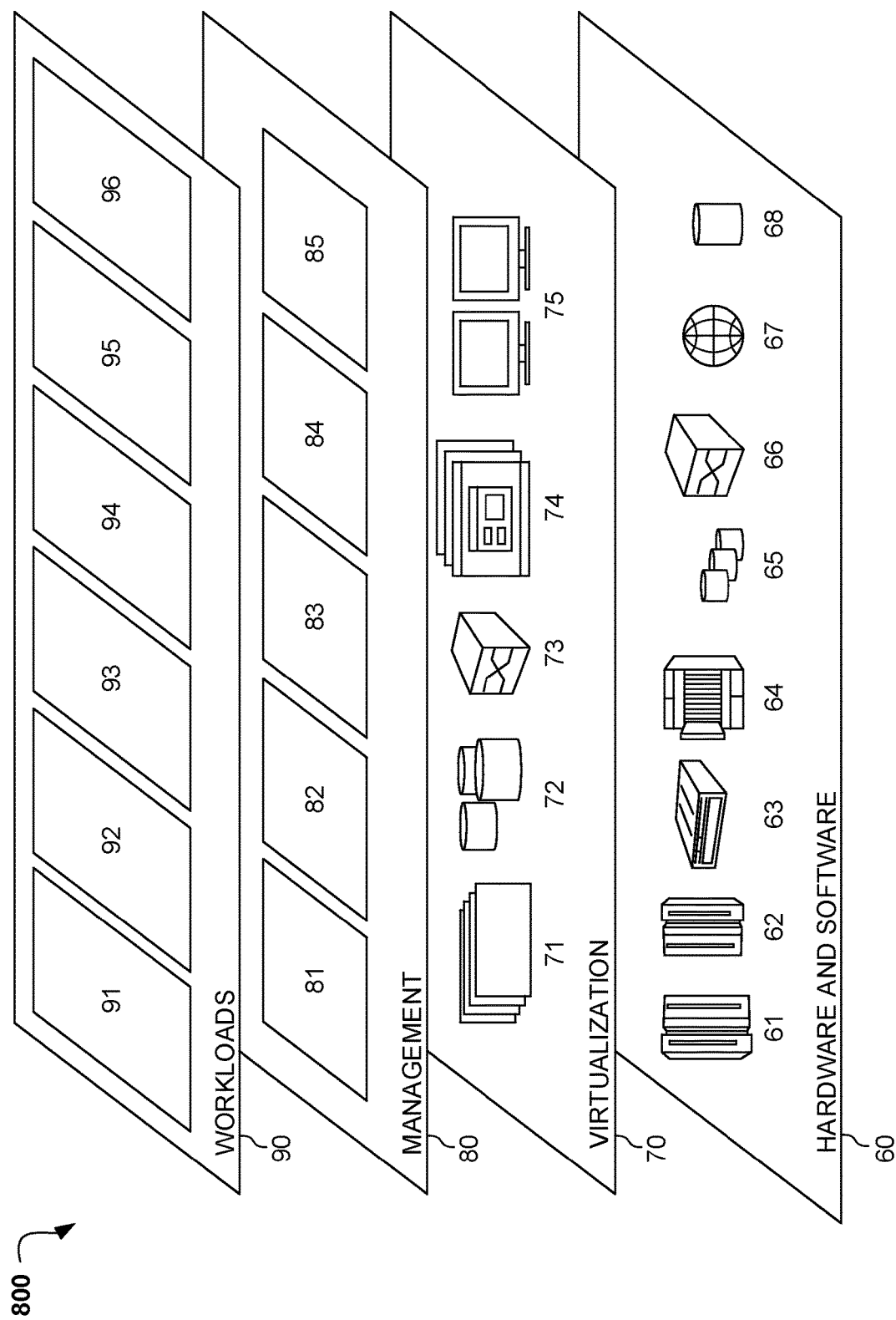
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and statistical inference attack prevention 96. Statistical inference attack prevention 96 may relate to prevent statistical inference attacks on data that is shared among multiple stakeholders with disjoint access privileges.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for updating a shared medium comprising:
    determining a uniform size of a data structure for all entries in the shared medium;
    updating an entry to the shared medium comprising:
        creating a first data structure of the size of the data structure for entries;
        adding content to the first data structure; and
        adding dummy content to the first data structure until the size of the content and the size of the dummy content are the uniform size of the data structure for entries; and
    storing the entry in the shared medium.

2. The method of claim 1, wherein adding content to the first data structure comprises:
    determining the content is private;
    creating a link to the private content, wherein the link points to a location outside of the shared medium;
    encrypting the link; and
    adding the encrypted link to the first data structure.

3. The method of claim 2, wherein adding dummy content to the first data structure comprises:
creating a dummy link;
encrypting the dummy link; and
adding the encrypted dummy link to the first data structure.

4. The method of claim 3, wherein creating a link to the private content and creating a dummy link create placeholders having a same size.

5. The method of claim 4, wherein the shared medium comprises a distributed ledger.

6. The method of claim 4, wherein the shared medium comprises blockchain.

7. The method of claim 1, wherein adding dummy content to the first data structure comprises:
creating a dummy link;
encrypting the dummy link; and
adding the encrypted dummy link to the first data structure.

8. A computer system for updating a shared medium, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer method is capable of performing a computer system comprising:
determining a uniform size of a data structure for all entries in the shared medium;
updating an entry to the shared medium comprising:
creating a first data structure of the size of the data structure for entries;
adding content to the first data structure; and
adding dummy content to the first data structure until the size of the content and the size of the dummy content are the uniform size of the data structure for entries; and
storing the entry in the shared medium.

9. The computer system of claim 8, wherein adding content to the first data structure comprises:
determining the content is private;
creating a link to the private content, wherein the link points to a location outside of the shared medium;
encrypting the link; and
adding the encrypted link to the first data structure.

10. The computer system of claim 9, wherein adding dummy content to the first data structure comprises:
creating a dummy link;
encrypting the dummy link; and
adding the encrypted dummy link to the first data structure.

11. The computer system of claim 10, wherein creating a link to the private content and creating a dummy link create placeholders having a same size.

12. The computer system of claim 11, wherein the shared medium comprises a distributed ledger.

13. The computer system of claim 11, wherein the shared medium comprises blockchain.

14. The computer system of claim 8, wherein adding dummy content to the first data structure comprises:
creating a dummy link;
encrypting the dummy link; and
adding the encrypted dummy link to the first data structure.

15. A computer program product for updating a shared medium, the computer program product comprising:
one or more computer-readable tangible storage medium and program instructions stored on at least one of the one or more tangible storage medium, the program instructions executable by a processor to cause the processor to perform a method comprising:
determining a uniform size of a data structure for all entries in the shared medium;
updating an entry to the shared medium comprising:
creating a first data structure of the size of the data structure for entries;
adding content to the first data structure; and
adding dummy content to the first data structure until the size of the content and the size of the dummy content are the uniform size of the data structure for entries; and
storing the entry in the shared medium.

16. The computer program product of claim 15, wherein adding content to the first data structure comprises:
determining the content is private;
creating a link to the private content, wherein the link points to a location outside of the shared medium;
encrypting the link; and
adding the encrypted link to the first data structure.

17. The computer program product of claim 16, wherein adding dummy content to the first data structure comprises:
creating a dummy link;
encrypting the dummy link; and
adding the encrypted dummy link to the first data structure.

18. The computer program product of claim 17, wherein creating a link to the private content and creating a dummy link create placeholders having a same size.

19. The computer program product of claim 18, wherein the shared medium comprises blockchain.

20. The computer program product of claim 15, wherein adding dummy content to the first data structure comprises:
creating a dummy link;
encrypting the dummy link; and
adding the encrypted dummy link to the first data structure.

* * * * *